US012399826B1

(12) United States Patent
 Rosemarine

(10) Patent No.: US 12,399,826 B1
(45) Date of Patent: Aug. 26, 2025

(54) NEURAL NETWORK PROCESSING

(71) Applicant: Arm Limited, Cambridge (GB)

(72) Inventor: Elliot Maurice Simon Rosemarine, London (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/608,771

(22) Filed: Mar. 18, 2024

(51) Int. Cl.
 *G06F 12/08* (2016.01)
 *G06F 12/0802* (2016.01)
 *G06N 3/02* (2006.01)

(52) U.S. Cl.
 CPC .......... *G06F 12/0802* (2013.01); *G06N 3/02* (2013.01); *G06F 2212/60* (2013.01)

(58) Field of Classification Search
 CPC .... G06F 12/0802; G06F 2212/60; G06N 3/02
 See application file for complete search history.

(56) References Cited

U.S. PATENT DOCUMENTS

2019/0362219 A1* 11/2019 Scheffler ............... G06N 3/04
2023/0013998 A1   1/2023 Mody et al.

OTHER PUBLICATIONS

Combined Search and Examination Report, App. No. GB2501147.9, Mailed Jul. 14, 2025, 9 pages.
Herrero, et al, "Distributed Cooperative Caching," PACT'08, Oct. 25-29, 2008, Toronto, Ontario, Canada. Copyright 2008 ACM 978-1-60558-282-5/08/ 10, 10 pages.

* cited by examiner

*Primary Examiner* — Jae U Yu
(74) *Attorney, Agent, or Firm* — Berkeley Law & Technology Group, LLP

(57) ABSTRACT

A processor, method and computer program for artificial neural network processing and comprising a neural processing element operable to perform processing operations on data; a dedicated neural storage element accessible only by the neural processing element; a shared storage element accessible by the neural processing element and one or more other processing elements configured to perform separate processing operations; and a control element operable to control task processing by the processor, respective tasks to be executed as a graph of operations, wherein each operation maps to a corresponding neural processing element, and wherein each connection between operations in the graph maps to a corresponding storage element for storing in-process data; and wherein, for a given task connection, the control element is configured to select between neural storage and shared storage and to direct reading and writing of in-process data corresponding to the connection to the selected storage.

20 Claims, 6 Drawing Sheets

NEURAL ENGINE ARRANGEMENT 100

NEURAL NETWORK PROCESSING

Certain data processing techniques, such as neural network processing, involve the processing and generation of considerable amounts of data. This data must be manipulated, stored and communicated between or among different processing elements of the processor and of the program entity that is causing the processor to function. For example, when a neural network model is being executed, the execution process is typically broken down into smaller tasks or jobs, which can include tasks such as matrix multiplications, convolutions and other operations involved in neural network computations, and the data must be communicated between the processing elements that perform these various tasks.

In a model of neural network processing as considered in the present disclosure, a neural engine in operation to perform a process may be conceived as comprising a directed graph of processing elements (called sections) arranged to process data that is passed from processing element to processing element via an in-process data memory construct (called a pipe).

Aspects of the present invention allow for an extension of the processing element/section and in-process data/pipe architecture to provide additional options for data storage and transfer.

According to a first aspect of the present invention, there is provided a processor for artificial neural network processing and comprising: at least one neural processing element operable to perform processing operations on data; at least one dedicated neural storage element accessible only by the at least one neural processing element; at least one shared storage element accessible by the at least one neural processing element and one or more other processing elements configured to perform a separate series of processing operations; and a control element operable to control processing of tasks by the processor, respective tasks to be executed in the form of a graph of operations, wherein each of the operations maps to a corresponding neural processing element of the processor, and wherein each connection between operations in the graph maps to a corresponding storage element for storing in-process data; and wherein, for a given connection of a task, the control element is configured to select between the at least one neural storage element and the at least one shared storage element and to direct the reading and writing of the in-process data corresponding to the connection to the selected storage element.

Seen in a second aspect, the present invention provides a method of operation of a processor for artificial neural network processing and comprising: executing respective tasks in the form of a graph of operations, wherein each of the operations maps to a corresponding neural processing element of at least one neural processing element of the processor, and wherein each connection between operations in the graph maps to a corresponding storage element for storing in-process data; processing at least one in-process data entity by at least one neural processing element; selecting, for a given connection of a task, between at least one dedicated neural storage element accessible only by the at least one neural processing element and at least one shared storage element accessible by the at least one neural processing element and one or more other processing elements configured to perform a separate series of processing operations; and directing the reading and writing of the in-process data entity corresponding to the connection to the selected storage element.

In a further aspect, there may be provided a computer program product tangibly stored on a non-transitory computer-readable medium and comprising program code to cause a processor for artificial neural network processing to: execute respective tasks in the form of a graph of operations, wherein each of the operations maps to a corresponding neural processing element of at least one neural processing element of the processor, and wherein each connection between operations in the graph maps to a corresponding storage element for storing in-process data; process at least one in-process data entity by at least one neural processing element; select, for a given connection of a task, between at least one dedicated neural storage element accessible only by the at least one neural processing element and at least one shared storage element accessible by the at least one neural processing element and one or more other processing elements configured to perform a separate series of processing operations; and direct the reading and writing of the in-process data entity corresponding to the connection to the selected storage element.

A number of implementations of the present technology will now be described by way of example only and with reference to the accompanying drawings, in which.

Generally speaking, neural network processing requires various, particular arithmetic operations. For example, when applying a filter to an input data array, the processing may comprise performing weighted sums according to a "multiply accumulate" (MAC) operation. Typically, the data structures used to represent the data to be used for the neural network processing (e.g. the input data array, the filters, the output data array, etc.) are tensors. The arithmetic operations thus typically comprise tensor arithmetic, e.g. tensor multiplication, addition, and so on.

To facilitate neural network processing, in some data processing systems a dedicated neural network processing hardware engine is to perform such neural network processing as and when desired, e.g., in response to an application that is executing on a host processor (e.g. central processing unit (CPU)) requiring neural network processing.

Such a neural engine typically comprises hardware (for example comprising fixed function processing circuits) which is configured for more efficiently performing neural network processing operations of a particular type or types. For example, a neural engine may be, and typically is, configured to perform tensor arithmetic operations, such as tensor MAC operations, and may therefore comprise a plurality of fixed function multiplier accumulator circuits ("MAC units") which are arranged to perform such MAC operations on tensor data structures.

A benefit of providing a neural engine is therefore that at least these types of arithmetic operations can then be performed in a more optimized manner, e.g., using dedicated fixed function hardware circuitry, compared to using another processor (e.g. the CPU) to perform the calculations in a general purpose manner. This also then frees up other components (e.g. the host processor (CPU)) to perform other processing tasks, as desired, which may improve the overall processing efficiency. This can be particularly important for resource constrained devices, such as mobile devices, where the CPU resource may be limited.

In such data processing systems, the, e.g., host processor (CPU) will be operable to request the neural engine to perform a set of neural network processing operations, for example for an application executing on the host processor (CPU). A driver for the neural engine can then identify and determine the neural network processing to be performed, and indicate to the neural engine the appropriate operations, and data, for performing the desired neural network processing, typically using a neural engine program descriptor (NED) comprising indications of operations to be performed and the locations of data elements to be processed.

Figure 1:
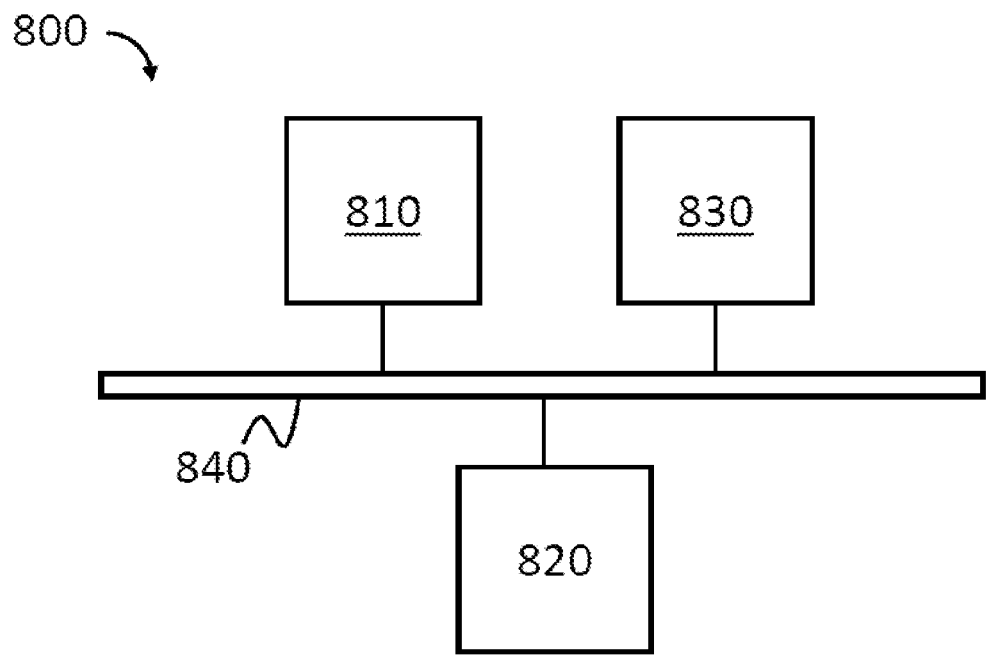
FIG. 1 illustrates schematically an example system in which the present technology can be implemented.

FIG. 1 shows schematically a system 800 representing a physical environment within which implementations of the present invention may be operable. The system 800 comprises host processor 810 such as a central processing unit, or any other type of general processing unit. The host processor 810 issues a command stream comprising a plurality of commands, each having a plurality of tasks associated therewith.

The system 800 also comprises one or more additional processors 830, which may comprise at least some of the neural network processing elements described herein and/or be configured to perform the methods described herein. An additional processor 830 may thus comprise at least a plurality of compute units and a command processing unit as described hereinabove. Each compute unit may comprise a plurality of processing modules or functional units each configured to perform at least one type of operation. The system 800 may also include at least one further additional processor (not shown), which may be the same as the processor 830. The additional processor(s) 830, and the host processor 810 may be combined as a System on Chip (SoC) or onto multiple SoCs to form one or more application processors.

The system 800 also comprises memory 820 for storing data generated by the tasks externally from the processor 830, such that other tasks operating on other processors may also readily access the data.

In some examples, the system 800 may comprise a memory controller (not shown), which may be a dynamic memory controller (DMC). The memory controller is coupled to the memory 820. The memory controller is configured to manage the flow of data going to and from the memory. The memory may comprise a main memory, otherwise referred to as a 'primary memory'. The memory may be an external memory, in that the memory is external to the system 800. For example, the memory 820 may comprise 'off-chip' memory. The memory may have a greater storage capacity than local caches of the processor 830 and/or the host processor 810. In some examples, the memory 820 is comprised in the system 800. For example, the memory 820 may comprise 'on-chip' memory. The memory 820 may, for example, comprise a magnetic or optical disk and disk drive or a solid-state drive (SSD). In some examples, the memory 820 comprises a synchronous dynamic random-access memory (SDRAM). For example, the memory 820 may comprise a double data rate synchronous dynamic random-access memory (DDR-SDRAM).

One or more of the host processor 810, the processor 830, and the memory 820 may be interconnected using a system bus 840. This allows data to be transferred between the various components. The system bus 840 may be or include any suitable interface or bus. For example, an ARM® Advanced Microcontroller Bus Architecture (AMBA®) interface, such as the Advanced eXtensible Interface (AXI), may be used.

A processor configured to perform neural network processing in the present technology can be any suitable and desired processor that is configured to perform neural network processing, e.g., and preferably, that includes processing circuits configured specifically to perform (to more optimally perform) processing operations of a type or types that will (e.g. more commonly) be required for neural network processing.

As described above, a processor configured to perform neural network processing may comprise one or more functional units, each configured to perform a processing operation or operations for neural network processing. The processor may comprise any suitable and desired number of such functional units.

Each functional unit is preferably configured to perform a particular, preferably selected, preferably determined, type or types of processing operation that are (e.g., more commonly) encountered during neural network processing (and preferably in an efficient, and preferably more optimal, manner), such as a particular, e.g., tensor, arithmetic operation, and preferably comprises appropriate, preferably fixed function, processing circuits for performing the operation or operations in question. For example, there may be a functional unit that is configured to (and comprises fixed function processing circuits configured to) perform multiply accumulate (MAC) operations.

The particular operations that the neural engine (by way of its functional unit(s)) is configured to perform can be any suitable and desired processing operations that are used for (and useful for) neural network processing.

The processor that is configured to perform neural network processing preferably comprises an (arithmetic) functional unit or units that is configured to (more optimally) perform arithmetic operations, such as, and preferably, tensor arithmetic operations, e.g. of a certain type, that will be more commonly encountered during neural network processing.

In an implementation the processor comprises, inter alia, a functional unit configured to apply a filter to an input data array and preferably to perform a weighted sum using input data and weight data. In an implementation, the functional unit(s) is configured to perform a weighted sum as a multiply-accumulate operation, and accordingly comprises one or more multiply-accumulate circuits (otherwise known as a multiplier-accumulator, or an "MAC unit") for performing a multiply-accumulate operation.

In an implementation, the processor that is configured to perform neural network processing comprises at least a functional unit that is configured to perform convolution like arithmetic operations (a fixed function convolution unit), preferably together with one or more other, preferably fixed-function, functional units which are configured to perform other (arithmetic) operations.

In an implementation the processor that is configured to perform neural network processing comprises one or more of, and preferably plural of, the following functional units: direct memory access units (e.g. to read/write tensors) (and which may include a compression and decompression unit); a weight decode fetches weights and may also include a decompression unit; one or more transform units, e.g. for rearranging data without any effect from the value of individual elements in the data, such as permuting dimensions, duplicating/broadcasting dimensions, inserting/removing dimensions or rearranging data order; one or more elementwise operation units, such as to perform arithmetic operations such as addition, multiplication, etc., logical operations (shifts, etc.), and/or bitwise operations; functional units to perform clamping (ReLU), scaling and/or zero point correction, lookup tables; one or more functional units to perform reduction operations, such as sum, min/max, argmax, argmin, etc.; one or more functional units to perform resize operations, such as scaling H/W dimensions, inserting zeros, replicating neighbors or bilinear filtering.

It would also be possible to have functional units that are able to perform plural of the above operations, such as a vector engine able to implement elementwise reduction and resize, for example.

Other arrangements would, of course, be possible.

Many data processing structures to be executed in a processor can be expressed or modelled as a directed graph. Examples of such data processing structures include neural networks which can be represented (as briefly described hereinabove) as a directed graph of operations that wholly compose the operations required to execute a network (i.e. to execute the operations performed across the layers of a neural network). A directed graph is a data structure of processing elements comprising instances of operations (herein referred to as 'sections') having directed connections therebetween that indicate a flow of operations. The connections between sections present in the graph of operations comprise in-process data elements that are passed from processing element to processing element via memory constructs referred to herein as "pipes". A graph may contain any number of divergent and convergent branches.

Figure 2:
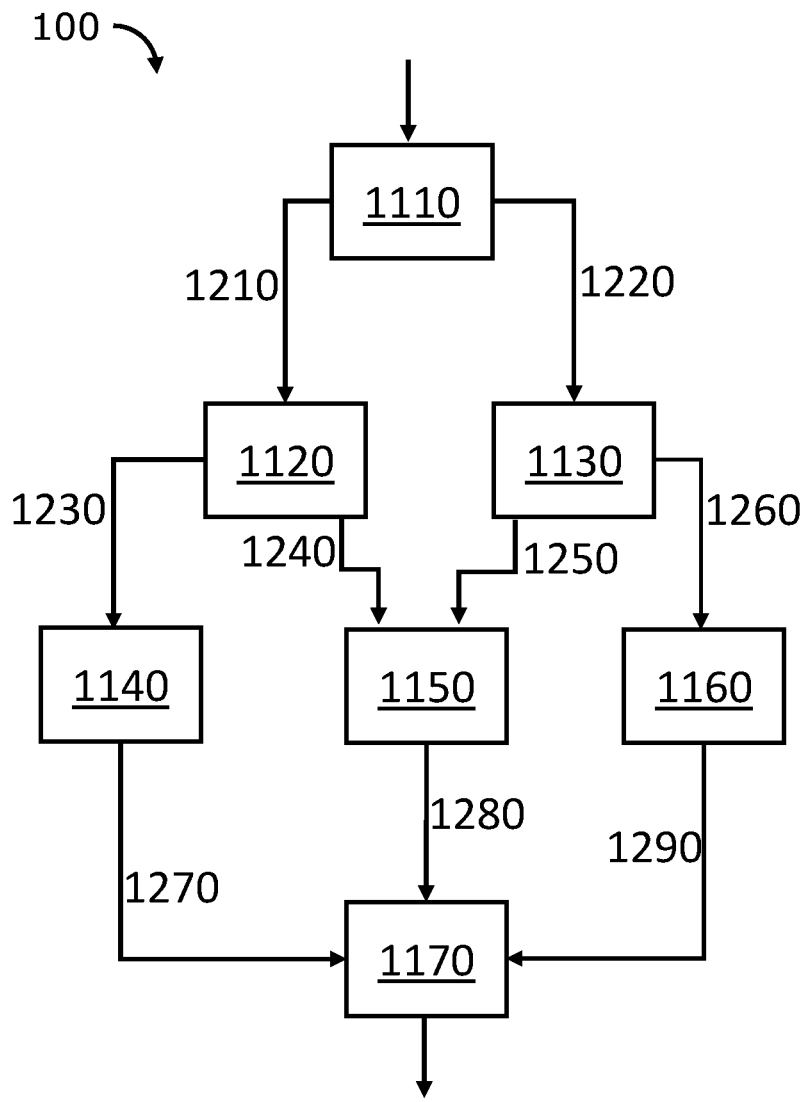
FIG. 2 illustrates an example directed graph according to the present technology.

FIG. 2 illustrates an example directed graph 100 in which sections are interconnected by a series of pipes. Specifically, an initial section, section 1 (1110) represents a point in the graph at which an operation, operation A, is to be performed when executing the graph. The output of operation A at section 1, 1100, is connected to two further sections, section 2 (1120) and section 3 (1130) at which respective operations B and C are to be performed. The connection between section 1 (1110) and section 2 (1120) can be identified as a pipe with a unique identifier, pipe 1 (1210). The connection between section 1 (1110) and section 3 (1130) can be identified as a pipe with a different unique identifier, pipe 2 (1220). The output of section 1, which is the result of performing operation A on the input to section 1, can be provided to multiple subsequent sections in a branching manner.

More generally, sections in the graph may receive multiple inputs, each from a respective different section in the graph via a respective different pipe. For example, section 1150 in FIG. 2 receives a first set of input data via pipe 1240 from section 1120 and a second set of input data via pipe 1250. Depending on the nature of the operation performed in a particular section and the dependencies of subsequent operations on the output of the operation, any number of input and output pipes may be connected to a particular section in the graph.

Figure 3:
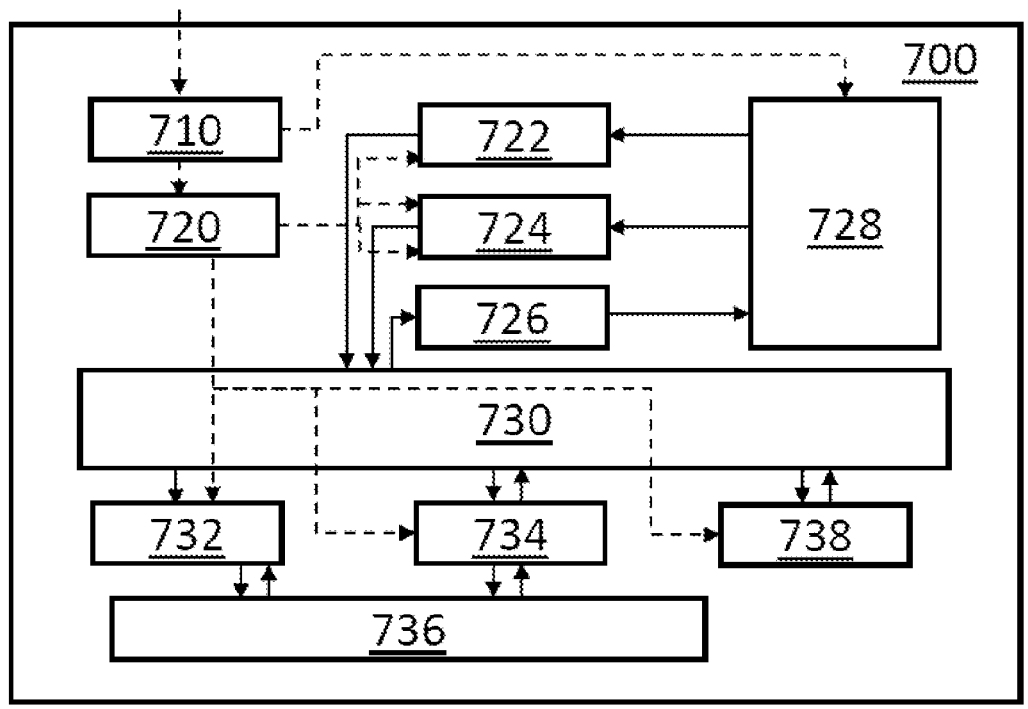
FIG. 3 illustrates a schematic diagram of a neural engine according to the present technology.

FIG. 3 is a schematic diagram of the hardware components of a neural engine 700 in a data processing system. The neural engine 700 includes a command and control module 710. The command and control module 710 receives tasks to be performed and also acts as an interface to storage external to the neural engine 700 which is arranged to store data to be processed by the neural engine 700, such as data representing a tensor, or data representing a stripe of a tensor. In the context of the present disclosure, a stripe is a subset of a tensor in which each dimension of the stripe covers a subset of the full range of the corresponding dimension in the tensor. The external storage may additionally store other data to configure the neural engine 700 to perform particular processing and/or data to be used by the neural engine 700 to implement the processing such as neural network weights.

The command and control module 710 interfaces to a handling unit 720, which is for example a traversal synchronization unit (TSU). In this example, each task corresponds to a stripe of a tensor which is to be operated upon in accordance with a sequence of operations according to at least a portion (e.g. a sub-graph) of the graph representation of the neural network. The tensor for example represents a feature map for processing using the neural network. A neural network typically includes a sequence of layers of processing, with an output from each layer being used as an input to the next layer. Each layer for example processes an input feature map by operating upon the input feature map to generate an output feature map, which is used as the input feature map for the next layer. The term "feature map" is used generically herein to refer to either an input feature map or an output feature map. The processing performed by a given layer may be taken to correspond to an operation.

In this example, the handling unit 720 splits data representing a stripe of a feature map into a plurality of blocks of data, each of which represents a respective part of the feature map. The handling unit 720 also obtains, from storage external to the neural engine 700, task data defining operations selected from an operation set comprising a plurality of operations. In this example, the operations are structured as a chain of operations representing a sequence of layers of the neural network. A block of data is allocated as an input to one of the operations by the handling unit 720.

The handling unit 720 coordinates the interaction of internal components of the neural engine 700, which include a weight fetch unit 722, an input reader 724, an output writer 726, a direct memory access (DMA) unit 728, a dot product unit (DPU) array 730, a vector engine 732, a transform unit 734, an accumulator buffer 736, and a storage 738, for processing of blocks of data. The data dependencies across the functional units are tracked by the handling unit 720. Processing is initiated by the handling unit 720 in a functional unit if all input blocks are available and space is available in the storage 738 of the neural engine 700. The storage 738 may be considered to be a shared buffer, in that various functional units of the neural engine 700 share access to the storage 738.

The operation of the neural engine may be considered as a directed graph comprising "sections" (processing elements or instances of the operations performed by functional units) and "pipes" (in-process data elements in transit between sections).

In the context of a directed graph representing the operations to be performed, each of the internal components that operates upon data can be considered to be one of two types of component. The first type of component is a functional unit to which a section that performs a specific instance of an operation within the graph may be mapped. For example, the weight fetch unit 722, input reader 724, output writer 726, dot product unit array 730, vector engine 732, transform unit 734 represent examples of functional units, and each is configured to perform one or more pre-determined and fixed operations (sections) upon data that it receives.

The connections between sections in the graph representing the neural network are referred to as pipes within the context of the graph. These pipes can also be mapped to the physical storage elements in the neural engine. For example, the accumulator buffer 736 and storage 738 (and portions thereof) can each be regarded as a storage element that can act to store data for a pipe within the graph. The pipes act as connections between the sections (as executed by functional units) to enable a sequence of operations as defined in the graph to be chained together within the neural engine 700. Put another way, the logical dataflow of the graph, as represented by sections and pipes, can be mapped to the physical arrangement of functional units and storage elements within the neural engine 700. Under the control of the handling unit 720, execution can be scheduled on the functional units and data can be passed between the functional units via the storage elements in accordance with the mapping, such that the chained operations of a graph can be executed. The handling unit 720 is configured to control and dispatch work representing the sections for performing operations of the graph on at least a portion of the data provided by a pipe.

The weight fetch unit 722 fetches weights associated with the neural network from external storage and stores the weights in the storage 738. The input reader 724 reads data to be processed by the neural engine 700 from external storage, such as a block of data representing part of a tensor. The output writer 726 writes data obtained after processing by the neural engine 700 to external storage. The weight fetch unit 722, input reader 724 and output writer 726 interface with the external storage via the DMA unit 728.

Data is processed by the DPU array 730, vector engine 732 and transform unit 734 to generate output data corresponding to an operation in the graph. The result of each operation is stored in a specific pipe within the neural engine 700. The DPU array 730 is arranged to perform one or more operations associated with a dot product operation between two operands, such as between an array of weights and a corresponding block of data (e.g. representing part of a tensor). The vector engine 732 is arranged to perform elementwise operations, for example to apply scale parameters to scale an output of a dot product calculated by the DPU array 730. Data generated during the course of the processing performed by the DPU array 730 and the vector engine 732 may be transmitted for temporary stage in the accumulator buffer 736 which maps the in-process data as a pipe between the previous operation and the subsequent operation, from where it may be retrieved by either the DPU array 730 or the vector engine 732 (or another different functional unit) for further processing as desired.

The transform unit 734 is arranged to perform in-block transforms such as dimension broadcasts or axis swaps. The transform unit 734 obtains data from a pipe, such as storage 738 (e.g. after processing by the DPU array 730 and/or vector engine 732), and writes transformed data back to the storage 738.

It will be appreciated that in a graph of operations there does not need to be only a single instance of a particular type of operation. For example, multiple instances of a convolution operation could be present in a graph of operations. In the above example hardware arrangement only a single convolution engine may be present, but multiple convolution sections may be performed. Therefore, it will be appreciated that there does not need to be a direct 1:1 mapping between operations in the graph (sections) and functional units, and similarly no direct 1:1 mapping between pipes and storage elements. In particular, a single functional unit may be configured at different instances in time to execute different instances of a convolution operation (e.g. a first and a second section in the graph).

All storage in the neural engine 700 may be mapped by pipes of the graph, including look-up tables, accumulators, etc. The storage arrangement, width and height of pipe can also be programmable, resulting in a highly configurable mapping between pipes and storage elements within the neural engine 700.

The processor that is configured to perform neural network processing also includes a control circuit that is configured to distribute processing tasks to the processing unit or units of the neural engine to cause the processing units to perform processing operations for neural network processing.

Again, this control circuit can take any suitable and desired form, and should be, and is preferably, operable to schedule corresponding processing tasks for, and on, the processing unit or units of the neural network processor in response to an indication of neural network processing to be performed provided to the control circuit. For example, in response to a given indication of neural network processing to be performed, the control circuit may schedule a corresponding processing task for an arithmetic processing unit of the processor, e.g. to cause the (arithmetic) processing unit to perform a tensor arithmetic operation for the neural network processing.

Other arrangements would, of course, be possible.

As described above, a data structure in the form of a directed graph may comprise plural sequenced operations that are connected to one another for execution in a chain by, for example, a neural engine as described hereinabove.

The neural engine thus has an architecture that can be described in terms of sections and pipes. Pipes represent storage within the neural engine, and sections describe operations on those pipes. A pipe is typically stored in a sized carveout of the neural engine's buffer, but can also be stored in other locations in the neural engine such as an accumulator buffer or a lookup table.

An input reader section is used to move data from external memory to a pipe, and an output writer moves data from a pipe to external memory. In systems having intermediate statelessness such as described herein, it is illegal to use an input reader to read back data written by an output writer from the same task—this would create a dependency that cannot be resolved by the architecture, as there is no guarantee in such an architecture that the write would be performed before the read.

All intermediate data in a neural engine task must therefore be represented by a pipe in order to correctly resolve dependencies. The amount of storage in the neural engine is finite, creating an upper limit on the size of a task.

Outside the neural engine, the processor may provide a standard hierarchical cache-based memory system. The neural engine accesses (by the input reader section) are typically routed to a core-local L1 cache (load/store cache, LSC), where L1 or level 1 cache is the cache closest to the processor in an L1-L2 . . . cache hierarchy.

The Lis in each core are coherent with a shared larger L2 cache. The sizes and access patterns of the neural engine are such that allocating in the L1 is typically of little value; instead, all accesses by the input reader and output writer are directed to the L2 (or system cache, where one is present) or not at all. The Lis are connected to the neural engine, but their cache capacity is effectively unused.

Also outside the neural engine, there is provided other storage normally dedicated to other uses by other processing elements, such as the non-neural processing execution engines. The storage may include, for example tile buffers (as will be explained below) or workgroup local storage. These are typically not part of the hierarchical cached memory system.

In some examples, the processor may be implemented within or in conjunction with a graphics processing unit that executes a graphics processing pipeline to generate a render output. One form of graphics processing pipeline is a so called tile-based graphics processing pipeline, wherein the two-dimensional render output or target is rendered as a plurality of smaller area sub-regions, usually referred to as "tiles". The tiles are each rendered separately (typically one after another). The rendered tiles are then combined to provide the complete rendering output (e.g. frame for display).

In this case, the pipeline preferably also comprises a tile buffer for storing tile sample values and/or a write out unit that operates to write the data in the tile buffer (e.g. once the data in the tile buffer is complete) out to external (main) memory (e.g. to a frame buffer).

In some examples, the processor for artificial neural network processing is restricted from performing neural network processing at the same time as associated graphics processing circuitry is operating. In such cases, or otherwise, unused capacity in these tile buffers is thus suitable for mapping pipes comprising in-process data of the neural engine, and thus may be considered as suitable for use as shared storage by the neural engine according to the present technology.

Similarly, in arrangements where workgroups are implemented with workgroup local storage, workgroup local storage may be suitable for use as shared storage by the neural engine according to the present technology.

The techniques used by the neural engine for addressing, reading from and writing to the neural engine storage may not be suitable for addressing, reading from and writing to the shared (non-neural engine) storage, and will therefore vary according to the type (cache, tile buffer, etc.) of the shared storage.

Figure 4:
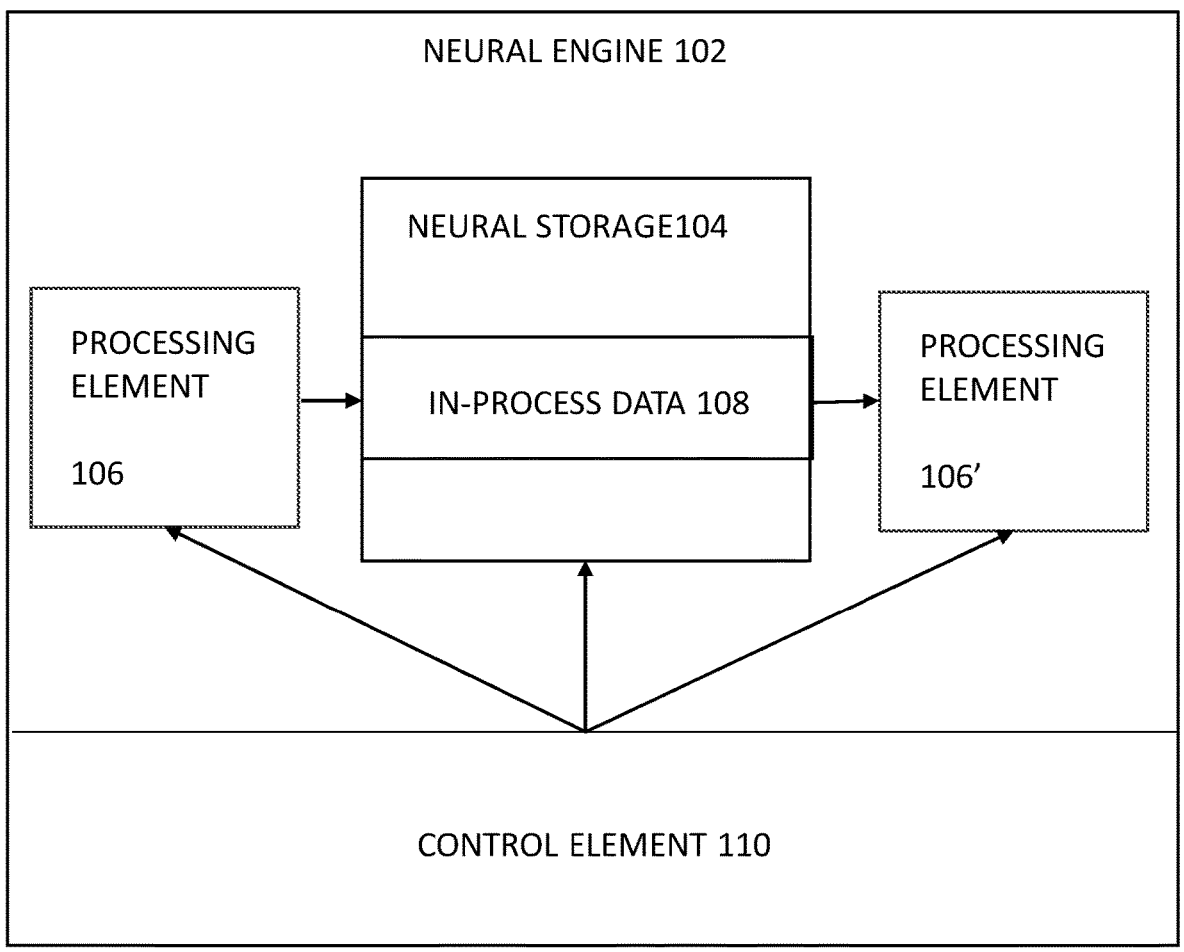
FIG. 4 shows in a much simplified form a neural engine arrangement according to a first aspect of the present technology.

A first arrangement of storage elements may thus be considered as represented by neural engine arrangement 100 in FIG. 4. In this arrangement, shown here in very simplified form, a neural engine 102 comprises a pair of processing elements 106, 106' for performing instances of one or more operations—sections—of the neural engine 102. As will be clear to one of skill in the art, the processing elements may comprise operations performed by different physical functional elements, or they may be instances of operations performed by the same physical functional element. Neural engine is further provided with a neural storage 104, which may comprise, for example, a buffer in the neural engine 102, and which is accessible only by the neural engine. The elements within neural engine 102 are operable under the control of control element 110, which may be, for example, a handling unit (in one implementation, a TSU) 720 of FIG. 3. Under the control of control element 110, processing element 106 performs its operations on data and transfers its output as in-process data (represented in the architecture as a pipe) 108, which maps to a portion of neural storage 104. Processing element 106' then accepts as input the in-process data 108 from neural storage 104 and performs its operations on that data.

Figure 5:
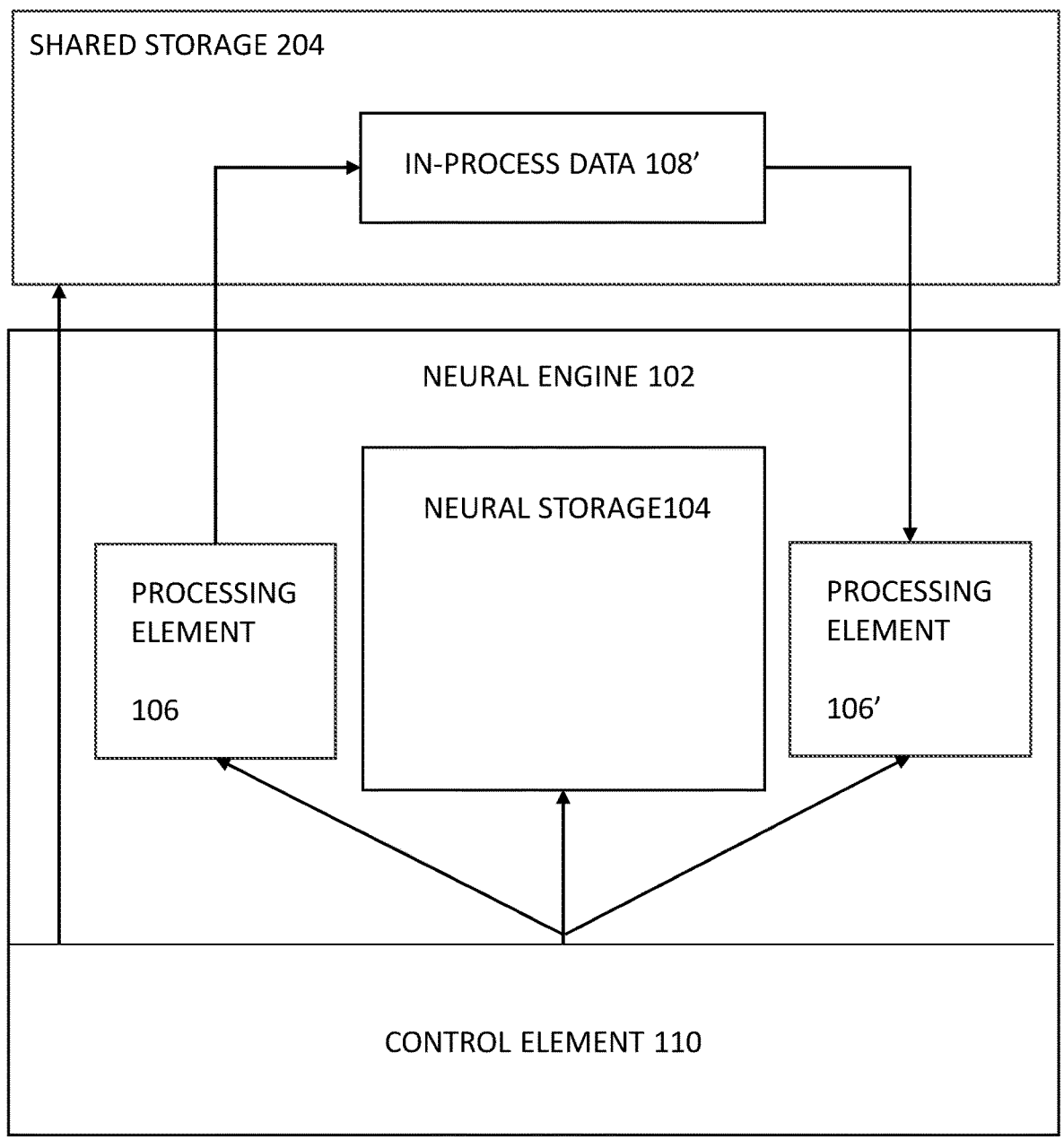
FIG. 5 shows in a much simplified form a neural engine arrangement according to a second aspect of the present technology.

The arrangement of FIG. 4 may now be considered in an extended form according to an implementation of the present technology. An extended neural engine arrangement 200 is shown in FIG. 5, which comprises neural engine 102 including processing elements 106, 106', neural storage 104 and control element 110 as the arrangement in FIG. 4. In the neural engine arrangement 200 of FIG. 5, control element 110 is further operable to control at least some portion of shared storage 204, which may, for example, comprise an L1 cache, a tile buffer or the like. In this implementation, processing element 106 performs its operations on data and transfers its output as in-process data 108', which may map to a portion of shared storage 204. Processing element 106' then accepts as input the in-process data 108 from shared storage 204 and performs its operations on that data.

Implementations of the present technology thus provide an extension to the section/pipe architecture such that pipes can be described that map to external memory—that is, to memory remote with respect to the neural engine, as opposed to the internal memory, local to the neural engine. In one possible implementation, these pipes would utilize the unused L1 cache capacity without any modification to the L1 and the processor memory system. In another possible implementation, described further below, there may be provided mechanisms by which the L1 cache system could be made aware of this pipe system and provide specific capacity carveouts and/or more useful allocation management.

Such schemes allow data to be spilled from the neural engine in the middle of a task and pulled back in at a later point. This potentially allows for bigger tasks either in terms of operation-space bounding box or in terms of the size (length) of the graph/cascade.

The neural engine is stateless between tasks: no data in pipes is retained. The same remains true in the present technology. Data might be written to the hierarchical memory system, but it is still subject to the existing rules of the section/pipe architecture. The data might be there in memory, but no mechanism is provided to access it after the completion of the task.

In some implementations, a pipe in external memory might be just like a pipe in internal memory (such as an internal buffer of the neural engine). In other implementations, a special section type might be introduced to provide a mem-copy to/from a local buffer pipe and an external memory pipe. In some cases, the first implementation may be preferred over the latter behaviour to avoid allocating local buffer space for the external memory pipe.

To support the first implementation mentioned above, and reduce the extent to which sections are subjected to full external memory latency (200-300 cycles) enhancements that may be made to L1 management are discussed below. These can alleviate significant bubbles in the sections (Convolution, etc) consuming from the pipes and help ensure that an external memory pipe remains resident in L1 and therefore latency is much more tolerable. Increased buffering would still be required, and in all likelihood the high bandwidth requirements of a Convolution section would be too much, but chains of Transform or Vector operations would be much more amenable.

An address to use is also provided. This address must be unique at least per-core, and possibly also per-task. This uniqueness is required to ensure that there are no collisions between tasks executing on different cores at the same time. The pipe parameters are specified as part of the neural engine program descriptor (NED), which is common for multiple tasks and jobs. The pipe can therefore contain a base address to use for its storage, but this must be used with a unique offset. The iterators that split a job into tasks can be used to provide this using a mechanism similar to that which they use for arrays of weight streams. The iterators can, for example, increment a value for each task, providing each task with a unique number U. If a pipe is specified with base address A, and with buffer size S and number of buffers N, then the address to use would be A+S*N*U.

A pipe may comprise a number of buffers. These are "physical" buffers. By contrast, the neural engine's handling unit iterates through operation-space to generate a number of blocks, each of which may be represented by a "virtual" buffer in their source input and output destination pipes. The pipe's physical buffer therefore acts as a FIFO of the virtual buffer.

With a pipe in external memory, the same principles are true. This means that if a pipe has two buffers, then, when the third block is being processed, it is being stored in the location of the first physical buffer. This address wrapping means that throughout a task the system is repeatedly accessing the same small range of addresses (total range S*N). This helps reduce cache thrashing: if instead each virtual buffer continued to increment in the address range, the cache management might make bad decisions about what to evict. By reusing the same limited address range by having virtual buffers wrap round physical buffers, the burden of cache management (the overhead involved in evictions, etc.) is reduced.

In implementations, all neural engine accesses to the pipe's address range use standard coherency management instructions to help minimise cache management overhead. As a minimum, this would be an indication to allocate memory for the pipe in the L1 cache and to not allocate memory in L2 cache unless the pipe is evicted from L1 cache. Because, in implementations, the memory system may be a coherent memory system, these accesses would likely still need to serialize with the L2 cache, even if the system is not allocating L2 cache memory for this purpose. This serialization requirement creates pressure on the L2 coherency system (snoop filter or directory) which may have a capacity limit.

In one implementation, when the reading and writing of the in-process data is to the storage element of the memory system, the neural processing element can use an addressing scheme consistent with an addressing scheme used by at least one other further processing element to access the at least one neural storage element. In such an implementation, the control element may be arranged to detect that the in-process data is to be read by a single reader operation and responsively to cause invalidation of the in-process data in the storage element of the memory system after the single reader operation.

In implementations, the handling unit can indicate that the system has reached the end of a task, thus prompting the neural engine to issue a string of cache invalidation instructions for the entire address range of the pipe. Alternatively, the handling unit might provide this indication for each physical buffer on its last access. Such indication would be with a separate Make Invalid instruction, marking the data at the address invalid: if it is dirty (which it presumably will be), it does not matter, the data is no longer relevant. Some coherency systems support a Read Once Make Invalid instruction which combines the read with the invalidation.

This could be done for every virtual buffer, rather than requiring the system to detect the final virtual buffer for each physical buffer. The Read Once Make Invalid instruction could be used when the system accesses a virtual buffer as the sole consumer of the pipe. If the pipe has multiple consumers, the handling unit must indicate which section should use a regular read operation (e.g. Read Once) and which, as the final consumer, should use the Read Once Make Invalid.

With data being constantly invalidated like this, cache collisions from accesses from the neural engine are reduced, but this implementation is still burdened with the address hashing involved in standard cache associativity. As such, as mentioned above, the capacity may be limited: a 32 KiB 4-way associative cache may limit implementation of the present technology to a 32/4=8 KiB pipe. Of course, some collisions do not cause actual failures, but they may cause burdensome evictions to L2 cache, which takes bandwidth away from the input reader/output writer accessing regular (non-pipe) data, as well as increasing latency. In systems where the hashing scheme is thoroughly understood, an implementation may risk some collisions by allowing a larger pipe, but this is an implementation choice.

In the first set of variant implementations described hereinabove, the changes in operation of the system are entirely contained within the neural engine and do not require any modification to the memory system of the supporting processor. In other implementations, it is possible to provide enhancements to the processor to provide additional advantageous features.

In a second possible implementation, there may be provided enhancements to the L1 cache mechanism to make it more amenable to being used as additional pipe storage, reducing the chances of spills, maximising capacity by eliminating the cache associativity and reducing other sources of latency such as address translation and L2 cache serialization.

In this implementation, when the reading and writing of the in-process data is to the storage element of the memory system, the neural processing element can be configured to use an addressing scheme distinct from an addressing scheme used to read from and write to the at least one neural storage element by a further processing element of the processor. In such an implementation, the addressing scheme can be configured to reserve a portion of the storage element of the memory system for the in-process data, by, for example, reserving a portion of the ways of a cache organized with plural ways or of a portion of the words of a cache organized with plural words.

The cache may, for example, be a level 1 cache (L1), which is conventionally the closest cache memory to the processor.

In this second example implementation, the system maps a pipe directly to the L1 cache's RAMs, as if it were something closer to the neural engine's internal shared buffer rather than a cache. Pipes targeting the internal shared buffer specify a buffer size in terms of a number of banks and number of words (banks*words=size of buffer); typically, a pipe uses all the words and one or more banks. For the L1 cache, each way could be considered a distinct bank, arranged, for example, to provide space for four 8 KiB pipes, two 16 KiB pipes, two 8 KiB and one 16 KiB pipe, or one 32 KiB pipe. The physical buffers of a pipe may then be mapped to the explicit RAM addresses of the L1 cache, thus eliminating the need to provide a base address in the NED and to have the iterator provide an increment for offsetting the base address.

This implementation requires a scheme in which the neural engine accesses the L1 using a system that is not the standard addressing scheme, which requires a new set of bus transaction operations, distinct from the typical coherency operations. The addressing scheme would not use virtual addresses, and this would allow the processor's memory management unit (MMU) to be bypassed, removing a significant source of latency. Additionally, as the system writes directly to the L1 cache's RAMs, there would be no need for allocations to be serialized with the L2 cache. In this implementation, the system has full, explicit control of the allocation of entries in the L1 cache, and there is no risk of collision or eviction.

In some scenarios, the processor's execution engine (EE) is running at the same time as the neural engine. The EE will require access to the L1 cache as it would in normal operations. To enable this, the system may be implemented to reserve half the ways for the neural engine, and the pipes defined in the NED would be limited appropriately in advance. Alternatively, half the words may be reserved, while maintaining all the ways. This allows the EE to still have a 4-way cache but at half the capacity. In this implementation also, the pipes defined in the NED are limited appropriately in advance.

This extended scheme allows pipes to be mapped to the processor's L1 cache in much the same way in which they are mapped to the neural engine's shared buffer. In one example, where the neural engine's shared buffer is 64 KiB, extending this with the 32 KiB of the L1 cache is a significant increase, which would lead to notable performance improvements without incurring meaningful additional area costs.

The various functions of the present invention may be carried out in any desired and suitable manner. For example, the functions of the present invention may be implemented in hardware or software, as desired. Thus, for example, the various processing elements, units, etc., of the present invention may comprise a suitable processor or processors, controller or controllers, functional units, circuits, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

Figure 6:
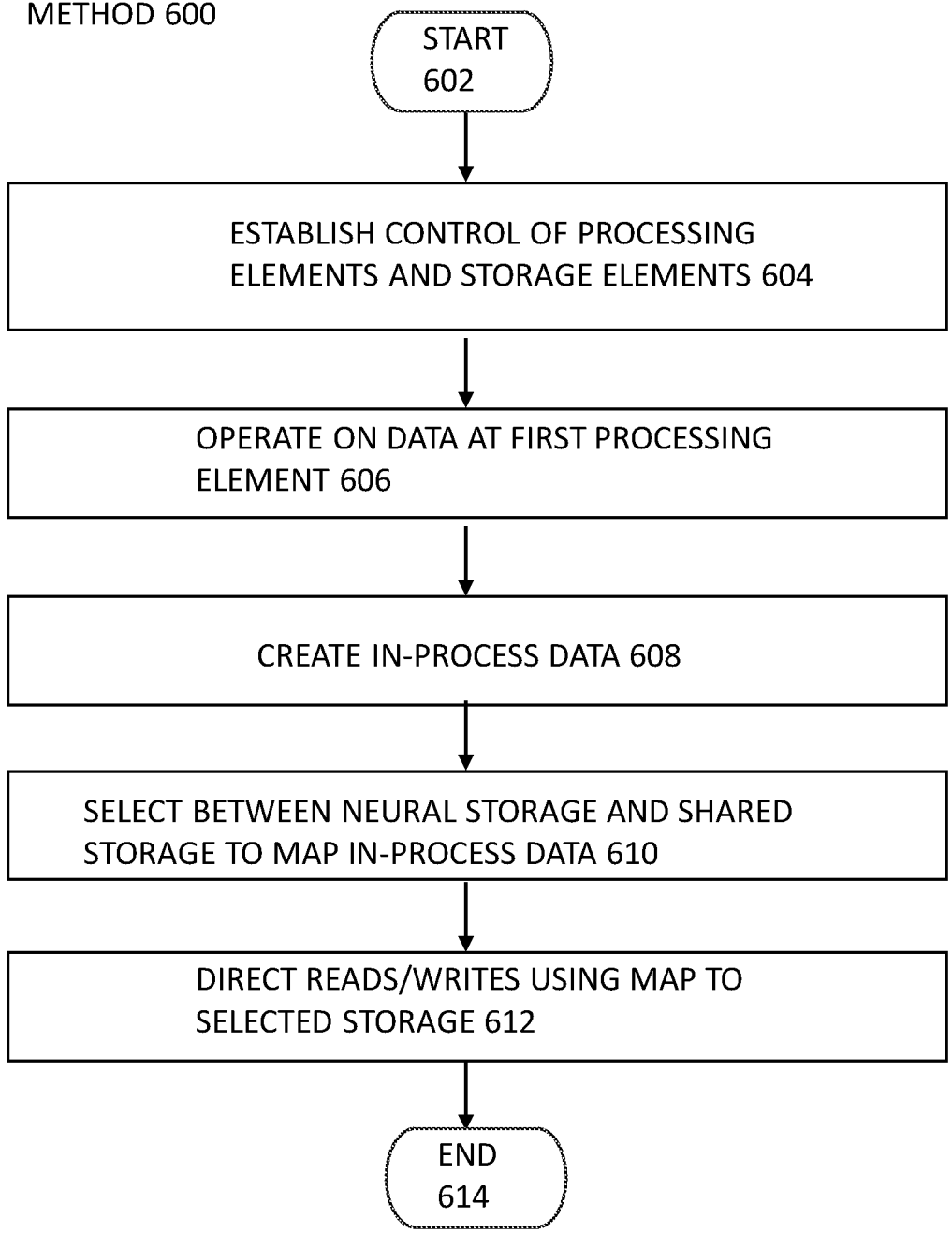
FIG. 6 shows a highly-simplified representation of a method of operation of a neural engine according to an implementation of the present technology.

FIG. 6 shows a method 600 of operation of a neural engine according to an implementation of the present technology. Method 600 starts at START step 602, and at 604, control is established over the processing elements and storage elements of the present technology as described hereinabove. At 606, a first processing element operates on some data, and at 608, the in-process data is created. At 610 a selection is made between neural storage accessible only to the neural engine and shared storage to map the in-process data, and at 612, reads and writes are directed to the selected storage. At END 614, the instance completes. As will be immediately clear to one of skill in the art, this flowchart merely represents one highly simplified example of a possible sequence of operations. In a real-world scenario, the arrangement will be considerably more complex and may involve extensive parallelism. As will also be clear to one of ordinary skill in the art, the whole sequence or one or more steps of the sequence may be repeated as the circumstances of the use case require.

As well as the processor configured to perform neural network processing, the data processing system may otherwise comprise any desired components and elements that a data processing system can comprise, such as one or more or all of: a display processing unit (display processor), one or more central processing units (CPU), a video processor, a digital signal processor, a display and a memory.

The processors may be arranged within a system-on-chip system.

The data processing system may be implemented as part of any suitable electronic device which may be required to perform neural network processing, e.g., such as a desktop computer, a portable electronic device (e.g. a tablet or mobile phone), or other electronic device. Thus, the present technology also extends to an electronic device that includes the data processing system of the present invention (and on which the data processing system operates in the manner of the present invention). The data processing system of the present invention may, in an implementation, be implemented as part of a portable electronic device (such as a mobile phone, tablet, or other portable device).

The present technology may be used in conjunction with and for any suitable and desired neural network and neural network processing. In preferred implementations, the neural network is a convolutional neural network.

In implementations, the neural network processing may relate to an "inferencing" or "classification" process. However, there are various different types or arrangements of neural networks that may be used to perform different operations, as desired, and the present invention may find utility in any suitable such applications. The present invention may also be used during a training process.

The input for the neural network processing may correspond to (or be derived from) any suitable data which is received by the data processing system for processing according to neural network processing in order to generate a useful output such as, for example, an image, an image from an Image Signal Processor (ISP), an image frame from video data, sound data or voice data, or other input data. Correspondingly the neural network processing which is to be performed may contribute to identifying or classifying features present within the data (initially) received by the data processing system, e.g. such as objects in an input image, or sound features in input sound data. Alternatively, the neural network processing which is to be performed may contribute to training the neural network.

It should be noted here that, as will be appreciated by those skilled in the art, the various functions, etc., of the present invention may be duplicated and/or carried out in parallel on a given processor. Equally, the various processing circuits may share processing circuits, etc., if desired.

It will also be appreciated by those skilled in the art that all of the described implementations of the present invention may include, as appropriate, any one or more or all of the features described herein.

While the earlier described embodiments implement the present technology in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor, optionally running a host operating system, supporting the simulator program. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques," Robert Bedichek, Winter 1990 USENIX Conference, Pages 53-63.

To the extent that implementations have previously been described with reference to particular hardware constructs or features, in a simulated implementation, equivalent functionality may be provided by suitable software constructs or features. For example, particular circuitry may be implemented in a simulated implementation as computer program logic. Similarly, memory hardware, such as a register or cache, may be implemented in a simulated implementation as a software data structure. In arrangements where one or more of the hardware elements referenced in the previously described implementations are present on the host hardware (for example, host processor), some simulated implementations may make use of the host hardware, where suitable.

The simulator program may be stored on a computer-readable storage medium (which may be a non-transitory medium), and provides a program interface (instruction execution environment) to the target code (which may include the applications, operating systems and hypervisor) which is the same as the application program interface of the hardware architecture being modelled by the simulator program. Thus, the program instructions of the target code, including the control of memory accesses based on the realm protection functionality described above, may be executed from within the instruction execution environment using the simulator program, so that a host computer which does not actually have the hardware features of the apparatus discussed above can emulate these features.

The methods in accordance with the present invention may be implemented at least partially using software e.g. computer programs. It will thus be seen that when viewed from further implementations the present invention comprises computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system.

The present invention also extends to a computer software carrier comprising such software which when used to operate a data processing system causes in a processor, or system to carry out the steps of the methods of the present invention. Such a computer software carrier could be a physical storage medium such as a ROM chip, CD ROM, RAM, flash memory, or disk.

It will further be appreciated that not all steps of the methods of the present invention need be carried out by computer software and thus from a further broad embodiment the present invention comprises computer software and such software installed on a computer software carrier for carrying out at least one of the steps of the methods set out herein.

The present invention may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

What is claimed is:

1. A processor for artificial neural network processing and comprising:
    at least one neural processing element operable to perform processing operations on data;
    at least one dedicated neural storage element accessible only by the at least one neural processing element;
    at least one shared storage element accessible by the at least one neural processing element and one or more other processing elements configured to perform a separate series of processing operations; and
    a control element operable to control processing of tasks by the processor, respective tasks to be executed in the form of a graph of operations, wherein each of the operations maps to a corresponding neural processing element of the processor, and wherein each connection between operations in the graph maps to a corresponding storage element for storing in-process data; and
    wherein, for a given connection of a task, the control element is configured to select between the at least one dedicated neural storage element and the at least one shared storage element and to direct reading and writing of the in-process data corresponding to the connection to the selected storage element.

2. The processor according to claim 1, wherein the shared storage element comprises a cache memory.

3. The processor according to claim 2, wherein the cache memory comprises a level 1 cache memory.

4. The processor according to claim 1, wherein the at least one shared storage element comprises dedicated storage otherwise configured for use by the one or more other processing elements for storing a predetermined type of data associated with a particular type of processing.

5. The processor according to claim 4, wherein when the reading and writing of the in-process data is to the dedicated storage otherwise configured for use by the one or more other processing elements, the control element is configured to reserve at least a portion of the dedicated storage for storing the in-process data.

6. The processor according to claim 4, wherein the control element is operable to select the dedicated storage otherwise configured for use by the one or more other processing elements only when it is determined that the dedicated storage is not otherwise being used by the one or more other processing elements.

7. The processor according to claim 4, wherein the one or more other processing elements are processing element(s) of a tile-based graphics processor and wherein the at least one shared storage element comprises a tile buffer otherwise configured to store a render output generated by the one or more other processing elements.

8. The processor according to claim 4, wherein the at least one shared storage element comprises workgroup local storage.

9. The processor according to claim 1, wherein when the reading and writing of the in-process data is to the shared storage element, the neural processing element is operable to use an addressing scheme consistent with an addressing scheme used by at least one other further processing element to access the at least one shared storage element.

10. The processor according to claim 1, wherein the control element is operable to detect that the in-process data is to be read by a single reader operation and responsively to cause invalidation of the in-process data in the shared storage element after the single reader operation.

11. The processor according to claim 1, wherein when the reading and writing of the in-process data is to the shared storage element, the neural processing element is operable to map the in-process data for reading and writing using an addressing scheme distinct from that used to read from and write to the at least one dedicated neural storage element.

12. The processor according to claim 1, wherein when the reading and writing of the in-process data is to the shared storage element, the neural processing element is operable to use an addressing scheme distinct from an addressing scheme used to read from and write to the at least one shared storage element by a further processing element of the processor.

13. The processor according to claim 11, wherein the addressing scheme is operable to reserve a portion of the shared storage element for the in-process data.

14. The processor according to claim 13, wherein the control element is operable to reserve the portion of the shared storage element by reserving at least one of a portion of ways of a cache organized with plural ways and a portion of words of a cache organized with plural words.

15. The processor according to claim 12, wherein the addressing scheme comprises a direct physical memory addressing scheme.

16. The processor according to claim 1, wherein the control element is configured to mitigate against eviction of the in-process data from the shared storage element by restricting an amount of in-process data stored to the shared storage element.

17. The processor according to claim 16, wherein the control element is configured to restrict the amount of in-process data stored to the shared storage element on the basis of at least one of:

a capacity of the storage element;

a capacity of the storage element divided by a predetermined integer; and a predetermined number of connections per task.

18. A method of operation of a processor for artificial neural network processing and comprising:

executing respective tasks in the form of a graph of operations, wherein each of the operations maps to a corresponding neural processing element of at least one neural processing element of the processor, and wherein each connection between operations in the graph maps to a corresponding storage element for storing in-process data;

processing at least one in-process data entity by at least one neural processing element;

selecting, for a given connection of a task, between at least one dedicated neural storage element accessible only by the at least one neural processing element and at least one shared storage element accessible by the at least one neural processing element and one or more other processing elements configured to perform a separate series of processing operations; and directing reading and writing of the in-process data entity corresponding to the connection to the selected storage element.

19. The method according to claim 18, comprising when the reading and writing of the in-process data is to the shared storage element, mapping the in-process data for reading and writing using an addressing scheme distinct from that used to read from and write to the at least one dedicated neural storage element.

20. A computer program product tangibly stored on a non-transitory computer-readable medium and comprising program code to cause a processor for artificial neural network processing to:

execute respective tasks in the form of a graph of operations, wherein each of the operations maps to a corresponding neural processing element of at least one neural processing element of the processor, and wherein each connection between operations in the graph maps to a corresponding storage element for storing in-process data;

process at least one in-process data entity by at least one neural processing element;

select, for a given connection of a task, between at least one dedicated neural storage element accessible only by the at least one neural processing element and at least one shared storage element accessible by the at least one neural processing element and one or more other processing elements configured to perform a separate series of processing operations; and direct reading and writing of the in-process data entity corresponding to the connection to the selected storage element.

* * * * *